United States Patent [19]
Zeng et al.

[11] Patent Number: 5,777,745
[45] Date of Patent: Jul. 7, 1998

[54] METHOD AND APPARATUS FOR COMPENSATING FOR NOISE GENERATED BY FLUCTUATION OF A MEDIUM AROUND AN OBJECT TO BE MEASURED

[75] Inventors: Lijiang Zeng; Hirokazu Matsumoto, both of Ibaraki; Keiji Kawachi, Tokyo, all of Japan

[73] Assignee: Japan Science and Technology Corporation, Saitama, Japan

[21] Appl. No.: 770,461

[22] Filed: Dec. 20, 1996

[51] Int. Cl.⁶ .................................................. G01B 11/14

[52] U.S. Cl. ........................ 356/373; 356/4; 356/28; 356/375

[58] Field of Search ........................ 356/373, 4, 28, 356/375

[56] References Cited

U.S. PATENT DOCUMENTS 4,175,365  11/1979  Leitz et al. ........................ 356/373

*Primary Examiner*—Frank G. Font
*Assistant Examiner*—Reginald A. Ratliff
*Attorney, Agent, or Firm*—Flehr Hohbach Test Albritton & Herbert LLP

[57] ABSTRACT

Compensation is performed to eliminate noise generated by fluctuation of a medium that surrounds an object to be measured. First and second laser beams having different wavelengths are generated by a He—Ne laser and a YAG laser, respectively, and are superposed by a first dichroic mirror such that they propagate along a common path. The first laser beam is caused to reflect off the object to be measured, while the second laser beam is reflected by a second dichroic mirror before reaching the object. The first and second reflected laser beams are separated from each other by a third dichroic mirror. The reflected first laser beam is detected by a first position sensor, while the reflected second laser beam is detected by a second position sensor. This makes it possible to compensate for noise generated by fluctuation of the medium around the object to be measured, so that the object can be measured accurately and reliably.

22 Claims, 2 Drawing Sheets

METHOD AND APPARATUS FOR COMPENSATING FOR NOISE GENERATED BY FLUCTUATION OF A MEDIUM AROUND AN OBJECT TO BE MEASURED

BACKGROUND OF THE INVENTION

1. Field of the Invention

The present invention relates to a method and apparatus for compensating for noise generated by fluctuation of a medium, such as air or water, that surrounds an object to be measured.

2. Description of the Related Art

Displacement measurement utilizing a laser beam has been used to measure the shape of objects and the like. Also, such displacement measurement utilizing a laser beam has been used at production sites for product inspection, production management, and the like.

As described above, displacement measurement utilizing a laser beam has been widely used in various fields at various levels, from basic research to manufacture of products. In such displacement measurement, the accuracy of measurement sometimes cannot be increased due to fluctuation of the air, water, or other medium around an object to be measured. Such fluctuation becomes noise in measurement.

Especially, when an object to be measured is placed in a flow of air or other medium (e.g., in a wind tunnel), a laser beam fluctuates due to turbulence of the air or the like, so that measurement sometimes becomes impossible.

SUMMARY OF THE INVENTION

An object of the present invention is to solve the above-mentioned problems and to provide a method and apparatus for compensating for noise generated by fluctuation of a medium around an object to be measured, thereby making it possible to reliably and accurately measure the object.

In order to attain the above-described object, the present invention provides a method for compensating for noise generated by fluctuation of a medium that surrounds an object to be measured. The method comprises the steps of:

(a) simultaneously generating first and second laser beams;

(b) combining the first and second laser beams;

(c) causing the first laser beam to reflect off an object to be measured;

(d) reflecting the second laser beam immediately before the second laser beam reaches the object;

(e) separating the first and second reflected laser beams from each other;

(f) detecting the first reflected laser beam through use of a first position sensor;

(g) detecting the second reflected laser beam through use of a second position sensor; and (h) based on detection values from the first and second position sensors, compensating for noise generated by fluctuation of the medium around the object.

The present invention also provides a method for compensating for noise generated by fluctuation of a medium that surrounds an object to be measured, wherein first and second laser beams having different wavelengths are generated by a He—Ne laser and a YAG laser, respectively, and are superposed by a first dichroic mirror such that they propagate along a common path; the first laser beam is caused to reflect off an object to be measured, while the second laser beam is reflected by a second dichroic mirror immediately before reaching the object; the first and second reflected laser beams are separated from each other by a third dichroic mirror; and the first reflected laser beam is detected by a first position sensor, while the second reflected laser beam is detected by a second position sensor.

The present invention further provides an apparatus for compensating for noise generated by fluctuation of a medium that surrounds an object to be measured. The apparatus comprising:

(a) means for simultaneously generating first and second laser beams;

(b) means for combining the first and second laser beams;

(c) means for causing the first laser beam to reflect off an object to be measured;

(d) means for reflecting the second laser beam immediately before the second laser beam reaches the object;

(e) means for separating the first and second reflected laser beams from each other;

(f) a first position sensor for detecting the first reflected laser beam;

(g) a second position sensor for detecting the second reflected laser beam; and (h) means for compensating for noise generated by fluctuation of the medium around the object based on detection values from the first and second position sensors.

The present invention provides the following advantages.

(1) It becomes possible to compensate for noise generated by fluctuation of a medium around an object to be measured, so that the object can be measured accurately and reliably. For example, use of two-color laser beams (a He—Ne laser beam and a YAG laser beam) eliminates noise by 50% or more, as compared with the case where only a He—Ne laser beam is used.

(2) When two-color laser beams are used, setup operation becomes easier and there is no possibility of causing positional error, because the two beams propagate along a common path.

(3) When a monochromatic light beam is used by dividing it into two beams, only a laser of a single color is needed, resulting in decreased cost.

DESCRIPTION OF THE PREFERRED EMBODIMENT

An embodiment of the present invention will now be described with reference to the drawings.

Figure 1:
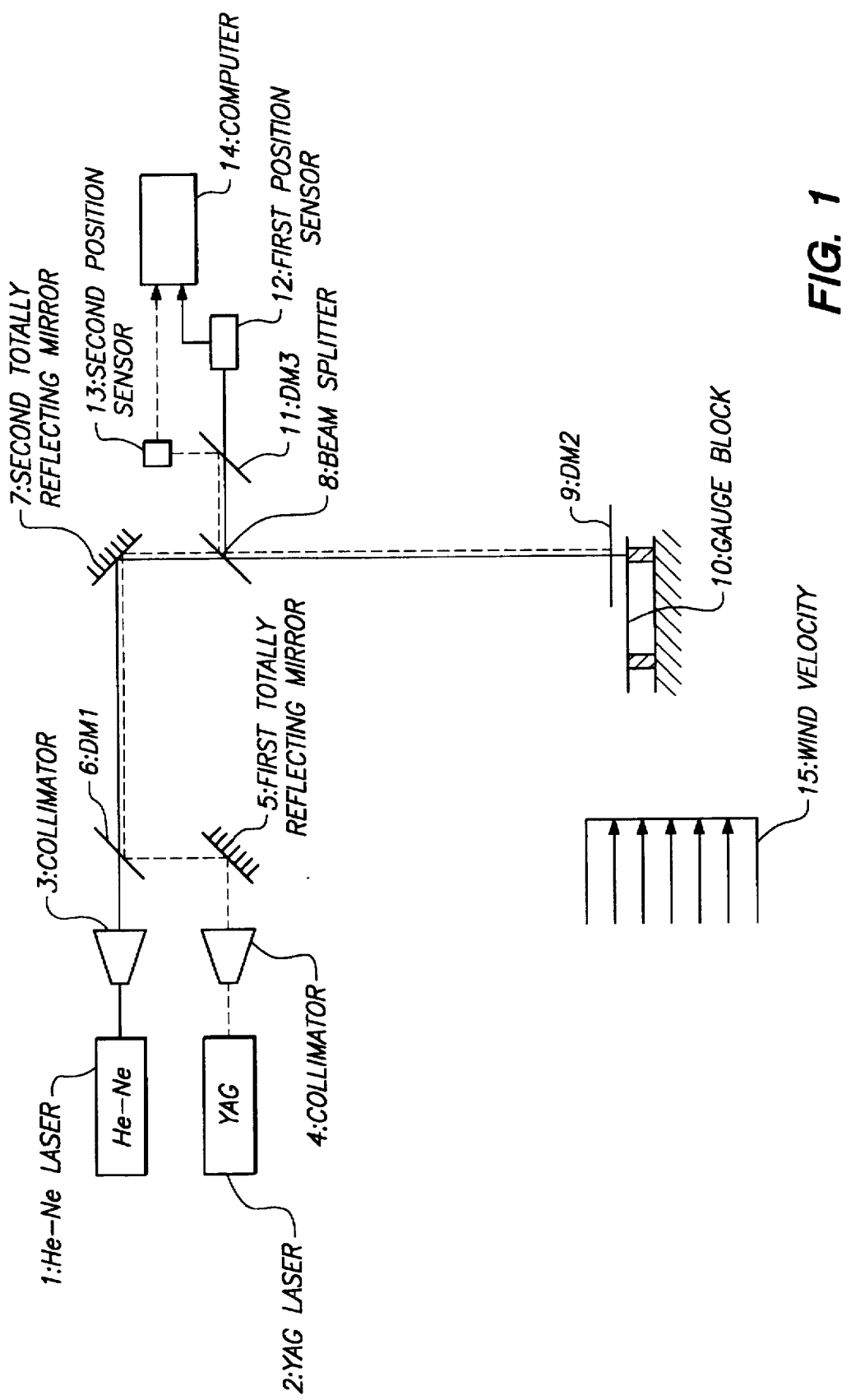
FIG. 1 is a view showing the structure of a measuring system according to an embodiment of the present invention in which compensation is performed to eliminate noise generated by fluctuation of a medium around an object to be measured.

FIG. 1 is a view showing the structure of a measuring system according to an embodiment of the present invention in which compensation is performed so as to eliminate noise generated by fluctuation of a medium around an object to be measured.

In FIG. 1, numeral 1 denotes a He—Ne laser ($\lambda_1$=633 nm), numeral 2 denotes a YAG laser ($\lambda_2$=1.06 µm), numerals 3 and 4 denote collimators, numeral 5 denotes a first totally reflecting mirror, numeral 6 denotes a first dichroic mirror (DM1), numeral 7 denotes a second totally reflecting mirror, numeral 8 denotes a beam splitter, numeral 9 denotes a second dichroic mirror (DM2), numeral 10 denotes a gauge block (object to be measured), numeral 11 denotes a third dichroic mirror (DM3), numeral 12 denotes a first position sensor, numeral 13 denotes a second position sensor, numeral 14 denotes a computer, and numeral 15 denotes a wind velocity.

A laser beam emitted from the He—Ne laser ($\lambda_1$=633 nm) 1 passes through the collimator 3 and reaches the first dichroic mirror (DM1) 6.

Meanwhile, a laser beam emitted from the YAG laser ($\lambda_2$=1.06 µm) passes through the collimator 4 and reflects off the first totally reflecting mirror 5, so that the laser beam reaches the first dichroic mirror (DM1) 6. The two laser beams from the He—Ne laser 1 and the YAG laser 2 are superposed at the first dichroic mirror (DM1) 6, so that two-color laser beams propagate along a common axis or path.

The two-color laser beams are reflected by the second totally reflecting mirror 7, so that they reach the beam splitter 8. The YAG laser beam is reflected by the second dichroic mirror (DM2) 9 fixedly disposed immediately upstream of the gauge block 10 in the direction of propagation of the laser beam, whereas the He—Ne laser beam is allowed to pass through the second dichroic mirror 9 and reaches the gauge block (object to be measured) 10, which reflects the laser beam.

The reflected laser beams are caused by the beam splitter 8 to propagate toward the third dichroic mirror (DM3) 11, which separates the reflected laser beams from each other. The YAG laser beam is detected by the second position sensor 13, and the He—Ne laser beam is detected by the first position sensor 12. Based on detection values output from the first and second position sensors 12 and 13, the computer 14 performs processing for measuring the object, and compensates for noise generated by fluctuation of a medium around the object.

Next, a detailed description will be given of a method of the present invention for compensating noise generated by fluctuation of the medium around the object to be measured.

First, the principle of measuring an object will be described.

The apparatus as shown in FIG. 1 is set. Laser beams having different wavelengths, which are output from the above-described two kinds of light sources, i.e., the He—Ne laser 1 and the YAG laser 2, are passed through the collimators 3 and 4 and are mixed by the first dichroic mirror (DM1) 6 such that they propagate along the common path. The YAG laser beam is reflected by the second dichroic mirror (DM2) 9 fixedly disposed immediately upstream of the gauge block 10 in the direction of propagation of the laser beam, whereas the He—Ne laser beam is allowed to pass through the second dichroic mirror 9 and reaches the gauge block 10, by which the laser beam is reflected. The reflected laser beams are separated from each other by the third dichroic mirror (DM3) 11. The YAG laser beams is detected by the second position sensor 13, and the He—Ne laser beam is detected by the first position sensor 12.

The output $\Delta V_{o1}$ from the first position sensor 12 includes information representing a tilt angle of the object and noise generated by fluctuation of the air around the object, whereas the output $\Delta V_{o2}$ from the second position sensor 13 does not depend on the tilt angle of the object. Accordingly, the noise generated by fluctuation of the air around the object can be canceled out.

The above-described method utilizing two-color laser beams will be referred to as a "Two-Color Compensation Method (TCC Method)."

Next, a method of analyzing the results obtained through measurement of the object will be described.

When the laser beams from the He—Ne laser (wavelength: $\lambda_1$) and the YAG laser (wavelength: $\lambda_2$) have beam position fluctuations of $\xi_1$ and $\xi_2$, respectively, the output $\Delta V_{o1}$ of the first position sensor 12 and the output $\Delta V_{o2}$ of the second position sensor 13 can be expressed as follows:

$$\Delta V_{o1}=k_1\times(\theta+\xi_1)$$

$$\Delta V_{o2}=k_2\times\xi_2$$

where $k_1$ and $k_2$ are coefficients which depend on the wavelengths of the laser beams and the characteristics of the position sensors, and $\theta$ is a tilt angle of the object to be measured. The following relationship exists between $\xi_1$ and $\xi_2$:

$$\xi_1=b\xi_2.$$

where b is a coefficient which depends on the fluctuation of the air around the object.

Accordingly, between the outputs of the position sensors there exists the following relationship:

$$\Delta V_{o1}=k_1\theta+(k_1/k_2)b\Delta V_{o2}=k_1\theta+c\Delta V_{o2}.$$

It is to be noted that the compensation according to the present invention is performed not for the fluctuation of the laser beams in the propagation direction, but for the fluctuation of the laser beams in a direction perpendicular to the propagation direction.

Next, a description will be given of measurement performed in an experiment.

In the experiment, the free end of a cantilevered plate was vibrated through use of a piezoelectric element, and displacement of the plate was measured. This experiment was performed in a wind tunnel so as to provide fluctuation to the air around the object.

First, without vibrating the object, calibration was performed while the wind velocity was varied from 0 m/s to 8 m/s. Measurement was performed for the case of employment of a single color method in which the He—Ne laser (wavelength: $\lambda_1$) or the YAG laser (wavelength: $\lambda_2$) was used singly, as well as for the case of employment of the TCC method in which the He—Ne laser (wavelength: $\lambda_1$) and the YAG laser (wavelength: $\lambda_2$) were used simultaneously. For these cases, the standard deviations $\sigma_1$, $\sigma_2$, and $\sigma_{12}$ of variations in the results of measurement were calculated. The thus-calculated standard deviations $\sigma_1$, $\sigma_2$, and $\sigma_{12}$ are shown in Table 1.

TABLE 1

| V (m/s) | 0 | 2 | 4 | 6 | 8 |
|---|---|---|---|---|---|
| $\sigma_1$ (arcsec) | 0.25 | 0.72 | 1.41 | 1.69 | 2.08 |
| $\sigma_2$ (arcsec) | 0.13 | 0.42 | 1.00 | 1.08 | 1.43 |
| $\sigma_{12}$ (arcsec) | | 0.31 | 0.56 | 0.78 | 1.01 |
| $1 - \sigma_{12}/\sigma_1$ (%) | | 56.9 | 60.3 | 53.8 | 51.4 |
| R | 0.10 | 0.90 | 0.91 | 0.90 | 0.88 |

The compensation efficiency is represented by $(1-\sigma_{12}/\sigma_1) \times 100$ (%). It is apparent from Table 1 that the noise was decreased by more than 50% through use of the TCC method, as compared with measurement using the He—Ne laser only.

Figure 2:
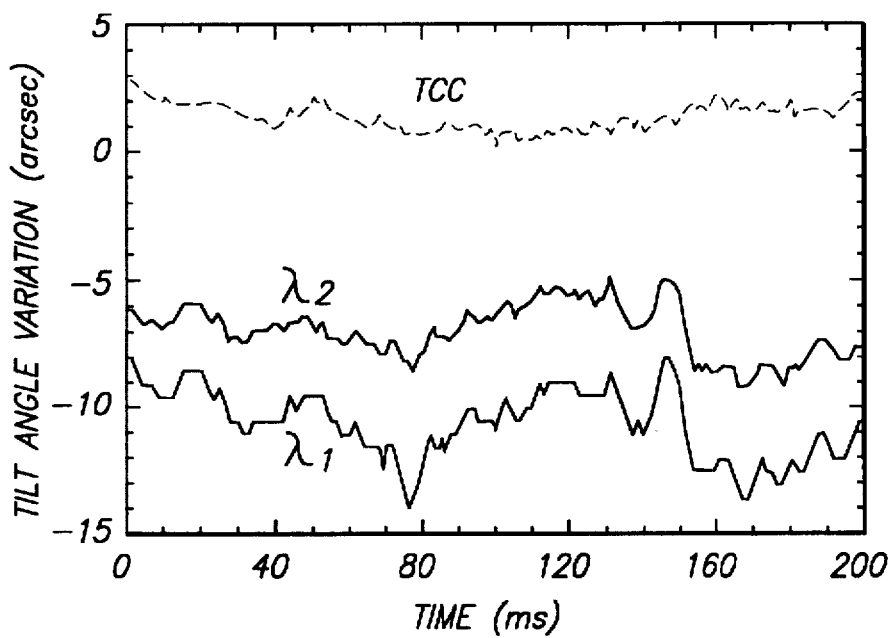
FIG. 2 is a graph showing the results of a measurement which was performed at a wind velocity of 4 m/s in a state in which compensation was performed according to the present invention so as to eliminate noise generated by fluctuation of the medium around the object to be measured.

The graph of FIG. 2 shows measurement results for wind velocity=4 m/s. In this graph, the vertical axis indicates tilt angle variation (arcsec), while the horizontal axis indicates time (ms).

As is apparent from the graph shown in FIG. 2, the measurement results were greatly affected by the fluctuation of the air around the object in the cases where the He—Ne laser (wavelength: $\lambda_1$) or the YAG laser (wavelength: $\lambda_2$) was used singly, and variations in the measurement result were small in the case where the TCC method was employed.

Figure 3:
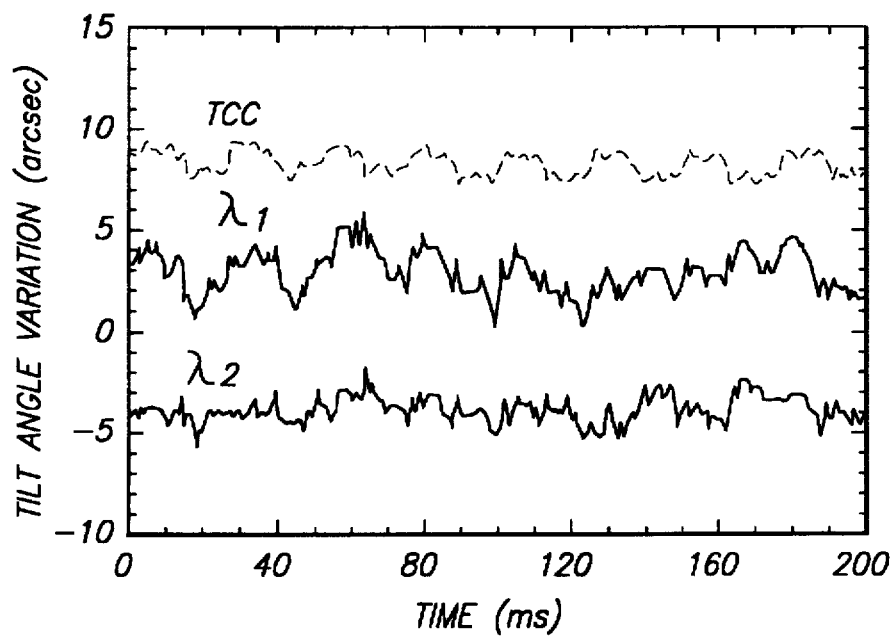
FIG. 3 is a graph showing the results of a measurement which was performed at a wind velocity of 4 m/s in a state in which a rectangular-wave vibration was applied, by a piezoelectric element, to the object to be measured and compensation was performed according to the present invention so as to eliminate noise generated by fluctuation of the medium around the object to be measured.

Next, a rectangular-wave vibration was applied to the object by a piezoelectric element. FIG. 3 shows the results of measurement for wind velocity=4 m/s. In this graph, the vertical axis indicates tilt angle variation (arcsec), while the horizontal axis indicates time (ms).

As is apparent from this graph, the use of the TCC method made it possible to observe the rectangular-wave vibration caused by the piezoelectric element, but when a single color method (single use of the He—Ne laser or the YAG laser) was employed, the rectangular-wave vibration was buried within noise, so that the rectangular-wave vibration was not able to be observed.

In the above-described embodiment, two-color laser beams are used. However, noise can be eliminated by dividing a monochromatic light beam into two light beams. In this case, these two light beams cannot be mixed by the first dichroic mirror (DM1) 6 such that they propagate along the same axis or path. Instead, they must be caused to propagate along respective paths close to each other. If they were mixed to share a common axis, the third dichroic mirror (DM3) 11 would not be able to separate them for detection by the first and second position sensors 12 and 13. Except for this point, the present compensation method is basically the same as the above-described embodiment.

The use of beams divided from a single monochromatic light beam decreases the cost of the apparatus.

The present invention is not limited to the above-described embodiments. Numerous modifications and variations of the present invention are possible in light of the spirit of the present invention and they are not excluded from the scope of the present invention.

What is claimed is:

1. A method for compensating for noise generated by fluctuation of a medium that surrounds an object to be measured, said method comprising the steps of:

(a) simultaneously generating first laser beam and a second laser beam;

(b) combining said first laser beam and said second laser beam;

(c) causing said first laser beam to reflect off an object to be measured thereby creating a first reflected laser beam, (d) reflecting said second laser beam in close proximity to where said first laser beam reaches said object thereby causing a second reflected laser beam;

(e) separating said first reflected laser beam and said second reflected laser beam from each other;

(f) detecting said first reflected laser beam through use of a first position sensor;

(g) detecting said second reflected laser beam through use of a second position sensor; and (h) based on detection values from said first position sensor and said second position sensor, compensating for noise generated by fluctuation of the medium around the object.

2. A method for compensating for noise generated by fluctuation of a medium that surrounds an object to be measured, wherein first and second laser beams having different wavelengths are generated by a He—Ne laser and a YAG laser, respectively, and are superposed by a first dichroic mirror such that they propagate along a common path; said first laser beam is caused to reflect off an object to be measured, while said second laser beam is reflected by a second dichroic mirror before reaching said object; said first and second reflected laser beams are separated from each other by a third dichroic mirror; and said first reflected laser beam is detected by a first position sensor, while said second reflected laser beam is detected by a second position sensor.

3. An apparatus for compensating for noise generated by fluctuation of a medium that surrounds an object to be measured, said apparatus comprising:

(a) means for simultaneously generating a first laser beam and a second laser beam;

(b) means for combining said first laser beam and said second laser beam;

(c) means for causing said first laser beam to reflect off an object to be measured thereby causing a first reflected laser beam;

(d) means for reflecting said second laser beam in close proximity to where said first laser beam reaches said object thereby causing a second reflected laser beam;

(e) means for separating said first reflected laser beam and said second reflected laser beam from each other;

(f) a first position sensor for detecting said first reflected laser beam;

(g) a second position sensor for detecting said second reflected laser beam; and (h) means for compensating for noise generated by fluctuation of the medium around the object based on detection values from said first position sensor and said second position sensor.

4. The method of claim 1, wherein:

said reflecting step is performed immediately upstream of where said second laser beam reaches said object.

5. The method of claim 1, wherein:

said simultaneously generating step includes the steps of generating said first laser beam at a first wavelength and generating said second laser beam at a second wavelength.

6. The apparatus of claim 3, wherein:

said means for reflecting said second laser beam is positioned immediately upstream of said second laser beam.

7. The apparatus of claim 3, wherein:

said means for simultaneously generating a first laser beam and a second laser beam is configured to generate said first laser beam at a first wavelength and generates said second laser beam at a second wavelength.

8. A method for compensating for noise generated by fluctuation of a medium that surrounds an object to be measured, said method comprising the steps of:

(a) generating a first laser beam;

(b) generating a second laser beam;

(c) directing said first laser beam at said object to be measured;

(e) directing said second laser beam at a reference located in close proximity to said object to be measured;

(f) reflecting said first laser beam from said object and generating a first reflected laser beam;

(g) reflecting said second laser beam from said reference and generating a second reflected laser beam; and (h) comparing said first reflected laser beam and said second reflected laser beam to compensate for noise generated by fluctuation of a medium that surrounds said object to be measured.

9. The method of claim 8, wherein said comparing step includes the steps of:

detecting said first reflected laser beam and generating a first detector signal;

detecting said second reflected laser beam and generating a second detector signal; and processing said first detector signal and said second detector signal to compensate for noise generated by fluctuation of a medium that surrounds said object to be measured.

10. The method of claim 9, wherein said processing step includes the step of:

determining a difference between said first detector signal and said second detector signal to compensate for noise generated by fluctuation of a medium that surrounds said object to be measured.

11. The method of claim 8, wherein:

said generating a first laser beam includes the step of generating said first laser beam at a first wavelength; and said step of generating a second laser beam includes the step of generating said second laser beam at a second wavelength different than said first wavelength.

12. The method of claim 11, wherein said comparing step includes the steps of:

detecting said first reflected laser beam and generating a first detector signal;

detecting said second reflected laser beam and generating a second detector signal; and processing said first detector signal and said second detector signal to compensate for noise generated by fluctuation of a medium that surrounds said object to be measured.

13. The method of claim 12, wherein said processing step includes the step of:

determining a difference between said first detector signal and said second detector signal to compensate for noise generated by fluctuation of a medium that surrounds said object to be measured.

14. The method of claim 11, further comprising the steps of:

combining said first laser beam and said second laser beam to create a composite laser beam wherein said first reflected laser beam and said second reflected laser beam form a composite reflected laser beam;

splitting said first reflected leaser beam from said composite reflected laser beam; and splitting said second reflected laser beam from said composite laser beam.

15. The method of claim 14, wherein said comparing step includes the steps of:

detecting said first laser beam and generating a first detector signal;

detecting said second laser beam and generating a second detector signal; and processing said first detector signal and said second detector signal to compensate for noise generated by fluctuation of a medium that surrounds said object to be measured.

16. The method of claim 15, wherein said processing step includes the step of:

determining a difference between said first detector signal and said second detector signal to compensate for noise generated by fluctuation of a medium that surrounds said object to be measured.

17. An apparatus for compensating for noise generated by fluctuation of a medium that surrounds an object to be measured, said apparatus comprising:

(a) a first laser configured to generate a first laser beam;

(b) a second laser configured to generate a second laser beam;

(c) a reference located in close proximity to said object to be measured;

(d) a first detector configured to detect a first reflected laser beam from said first laser beam reflected from said object to be measured and to generate a first detector signal in response to said first reflected laser beam;

(e) a second detector configured to detect a second reflected laser beam from said second laser beam reflected from said reference and to generate a second detector signal in response to said second reflected laser beam; and (f) a processor coupled to said first detector and said second detector and configured to process said first detector signal and said second detector signal to compensate for noise generated by fluctuation of a medium that surrounds said object to be measured.

18. The apparatus of claim 17, wherein:

said processor is configured to determine a difference between said first detector signal and said second detector signal to compensate for noise generated by fluctuation of a medium that surrounds said object to be measured.

19. The apparatus of claim 17, wherein:

said first laser is configured to generate said first laser beam at a first wavelength; and said second laser is configured to generate said second laser beam at a second wavelength different than said first wavelength.

20. The apparatus of claim 19, wherein:

said processor is configured to determine a difference between said first detector signal and said second detector signal to compensate for noise generated by fluctuation of a medium that surrounds said object to be measured.

21. The apparatus of claim 19, further comprising:

a combiner configured to combine said first laser beam and said second laser beam to create a composite laser beam, and wherein said first reflected laser beam and said second reflected laser beam form a composite reflected laser beam;

a separator configured to separate said first reflected leaser beam from said composite reflected laser beam.

22. The apparatus of claim 21, wherein:

said processor is configured to determine a difference between said first detector signal and said second detector signal to compensate for noise generated by fluctuation of a medium that surrounds said object to be measured.

* * * * *